United States Patent
Haubennestel et al.

(10) Patent No.: US 6,420,466 B1
(45) Date of Patent: Jul. 16, 2002

(54) PROCESS FOR PREPARING A THIXOTROPIC AGENT AND ITS USE

(75) Inventors: Karlheinz Haubennestel; Ulrich Orth, both of Wesel (DE)

(73) Assignee: BYK-Chemie GmbH (DE)

( * ) Notice: Subject to any disclaimer, the term of this patent is extended or adjusted under 35 U.S.C. 154(b) by 0 days.

(21) Appl. No.: 09/557,698

(22) Filed: Apr. 25, 2000

(30) Foreign Application Priority Data

Apr. 29, 1999 (DE) .......................................... 199 19 482

(51) Int. Cl.$^7$ .............................. B01J 13/00; C08K 5/21
(52) U.S. Cl. .................... 524/195; 516/31; 516/103; 528/903; 564/32
(58) Field of Search ................... 516/31, 103; 524/195, 524/198; 528/903; 564/56, 73, 32; 560/301

(56) References Cited

U.S. PATENT DOCUMENTS

| | | | | |
|---|---|---|---|---|
| 3,388,100 A | * | 6/1968 | Thoma et al. .......... | 528/903 X |
| 3,471,449 A | * | 10/1969 | Heydkamp et al. ..... | 528/903 X |
| 3,682,861 A | * | 8/1972 | Radlmann et al. ...... | 528/903 X |
| 3,893,956 A | * | 7/1975 | Brandt | |
| 4,089,835 A | * | 5/1978 | König et al. ............ | 516/31 X |
| 4,206,109 A | * | 6/1980 | Reischl et al. .......... | 516/31 X |
| 4,314,924 A | * | 2/1982 | Haubennestel et al. | |
| 4,383,068 A | | 5/1983 | Brandt ..................... | 524/196 |
| 4,579,899 A | * | 4/1986 | Kondo ..................... | 524/198 |
| 5,399,294 A | * | 3/1995 | Quednau .................. | 516/31 X |
| 5,410,008 A | * | 4/1995 | Bauer ...................... | 516/31 X |
| 5,446,200 A | * | 8/1995 | Bordin .................... | 564/73 X |
| 5,597,942 A | * | 1/1997 | Pohl et al. .............. | 524/195 X |
| 5,753,731 A | * | 5/1998 | Yoshioka et al. ......... | 524/198 |

FOREIGN PATENT DOCUMENTS

| | | | | |
|---|---|---|---|---|
| DE | 2359923 | 11/1976 | ............ | C09D/5/04 |
| EP | 0006252 A1 | 1/1980 | ............ | C09D/7/00 |
| GB | 1230 605 | 5/1971 | ............ | C08F/11/02 |

\* cited by examiner

*Primary Examiner*—Richard D. Lovering
(74) *Attorney, Agent, or Firm*—Schwegman, Lundberg, Woessner & Kluth, P.A.

(57) ABSTRACT

The invention relates to a process for preparing a solution that is active as a thixotropic agent and contains urea urethanes, in which monohydroxyl compounds are reacted with an excess of toluene diisocyanate, the unreacted portion of the toluene diisocyanate is removed from the reaction mixture and the monoisocyanate adduct obtained is further reacted with diarines in the presence of a lithium salt to form urea urethanes. The invention also relates to the use of the solution for imparting thixotropic properties to coating compounds.

10 Claims, No Drawings

PROCESS FOR PREPARING A THIXOTROPIC AGENT AND ITS USE

The invention relates to a process for preparing a solution that is active as a thixotropic agent and contains urea urethanes, in which monohydroxyl compounds are reacted with diisocyanate and the monoisocyanate adducts formed are further reacted with diamines in aprotic solvent in the presence of a lithium salt to form urea urethanes and to the use of the solution, in particular, for imparting thixotropic properties to coating compounds, such as, for Example, solvent-Containing, solvent-free and aqueous paints and lacquers, PVC plastisols and coatings based on epoxide and based on unsaturated polyester resins.

To control the rheology of liquid coating compounds, organically modified bentonites, silicic acids, hydrogenated castor oil and polyamide waxes are predominantly used. A disadvantage of these substances is that they are generally dry solids that have to be dispersed by means of solvents and shear forces to form semi-finished products or be introduced into the liquid coating compound by systematic temperature control. If these temperatures are not maintained, crystallites, which may result in defects in the coating, occur in the finished coating compound.

The general disadvantage of these rheological auxiliaries used at present is that they result in turbidities and clouds (haze) in clear, transparent coatings. In addition, handling dry, powdered products causing dusts during processing is undesirable.

Other achievements relating to rheology control were disclosed in European Patent Application EP-A-0 198 519. In the latter, an isocyanate is reacted with an amine in the presence of paint resin solutions to form a urea that forms needle-shaped crystals in very finely dispersed form. These paint binders modified in this way are offered as rheology-control agents and sag-preventing binders, as so-called "sag control agents".

The disadvantage of these products is the result of the fact that they are always bound to the binder in which they have been prepared and do not permit any subsequent universal correction of finished coating agents.

European Patent EP-B-0 006 252 describes a process for preparing a thixotropic agent that eliminates some of the abovementioned disadvantages by describing urea urethanes that are prepared in aprotic solvents in the presence of LiCl by reacting isocyanate adducts with polyamines. The disadvantage of the products prepared in this way is the undefined structure of said urea urethanes due to the preparation process. Although isocyanate monoadducts are described, there are in fact no monoadducts at all in this case, as becomes clearly apparent from the Example, but mixtures of different adducts. In the process described, one mole of a diisocyanate is first reacted with one mole of a monoalcohol. This process partly produces the desired NCO-functional monoadducts, but also diadducts with no NCO-functionality. In addition, a proportion of the monomeric diisocyanate remains unreacted.

The proportions of these different compounds may vary, depending on the accessibility of the NCO group and the reaction conditions applied, such as temperature and time. The reason for the greatest disadvantage is, however, that all these adducts prepared in this way, contain fairly large amounts of unreacted diisocyanate that, during the further reaction with polyamines in the presence of lithium chloride, results in uncontrolled chain extension of the urea urethane and in polymeric ureas. These products then have a tendency to precipitation and can be kept in solution only with the greatest difficulty.

The object of the present invention is therefore to find a process to generate thixotropic agent of a defined structure and consequently to enable a greater storage stability over several months of solutions prepared in this way and to enable a more reliable application of the products.

Surprisingly, it was found that this problem solution can be achieved in that monohydroxyl compounds of the general formula (I)

in which R is n-alkyl or isoalkyl containing 4 to 22 carbon atoms, cycloalkyl containing 6 to 12 carbon atoms, aralkyl containing 7 to 12 carbon atoms or a radical of the formula $C_mH_{2m+1}(O-C_nH_{2n})_x-$ or $C_mH_{2m+1}(OOC-C_vH_{2v})_x-$, where $m=1-22$, $n=2-4$, $x=1-15$ and $v=4$ or $5$, are reacted with a 1.5 times to 5 times molar excess of toluene diisocyanate, the unreacted part of the toluene diisocyanate is removed from the reaction mixture and the monoisocyanate adduct obtained is reacted with diamines of the general formula (II)

where $R''=-C_yH_{2y}$ with $y=2-12$ and/or with

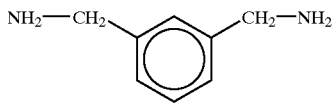

and/or with

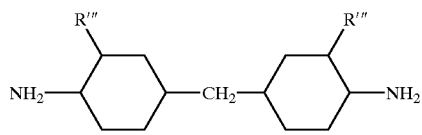

where $R'''=CH_3-$ or H, in the presence of a lithium salt.

The molar excess of toluene diisocyanate is preferably 2–4 mol, particularly preferably 2–3 mol. Preferably, the toluene diisocyanate isomers contain a 2,4-isomer proportion of 50–80%.

After completion of the reaction of the alcohol R—OH with parts of the available diisocyanate to form the isocyanate monoadduct, the unreacted excess of the diisocyanate is removed from the reaction mixture, preferably by vacuum distillation under mild conditions.

LiCl or LiNO$_3$, but preferably LiNO$_3$, may be used as lithium salts. The solids content of the urea urethane solutions generated in this way is 5–80%, preferably 20–60%, particularly preferably 25–50%. The reaction of the monoadducts with the diamine takes place in a polar aprotic solvent, such as, for Example, dimethyl sulfoxide, N,N-dimethylformamide, N,N-dimethylacetamide, N-methylpyrrolidone, N-butylpyrrolidone or comparable alkylpyrrolidones.

The amount of lithium compounds is 0.2–2 mol, preferably 0.5–1.5 mol, particularly preferably 0.75–1.25 mol of lithium, relative to the amine equivalent of the diamine used.

The use of LiNO$_3$ in contrast to LiCl is particularly advantageous since chloride ions have a disadvantageous effect on coating compounds and promote the corrosion of the metallic bases to which the thixotropic coating compounds are applied.

The urea urethanes prepared in this way do not contain either free isocyanate groups or free amino groups. They are accordingly physiologically safe. Furthermore, no adverse side reactions occur with binders or fillers. The storage stability of these urea urethane solutions prepared in this way is extraordinarily high and is certainly 6 months or more at, normal storage temperature.

1. COMPARISON EXAMPLE ACCORDING TO EP 0006252 (NOT ACCORDING TO THE INVENTION)

1 mol (174 g) of toluene diisocyanate (65% 2,4-isomer, referred to as T65 below) is introduced into the reaction vessel and 1 mol of butyl triglycol (mean MW: 212 g) is slowly added dropwise while stirring and the reaction is brought to an end by a known process. During this process, the temperature is kept below 40° C. The isocyanate adduct prepared in this way has a free TDI content of 7.3%, while the total NCO content is 10.9%. This reaction mixture is added to a solution of 0.5 mol of xylene diamine (68 g) and 0.75 mol of LiCl, relative to the amine equivalent, in N-methylpyrrolidone (NMP). The solids are 50% by weight. The reaction proceeds exothermically.

The urea solution prepared in this way has a tendency to form crystals or to gel formation after a relatively short time.

2. PREPARATION OF THE MONOADDUCTS (ACCORDING TO THE INVENTION), EXAMPLES 1–8

Example 1

0.5 mol (37 g) of n-butanol is added at 30° C. to 1.25 mol (217.5 g) of toluene diisocyanate (80% 2,4-isomer, referred to as T80 below) in 2 hours. In this process, the temperature is kept below 45° C. After completion of the addition, stirring is continued for a further 2 hours until the theoretical NCO content of 33.0% is reached. The isocyanate excess is distilled off in vacuum (0.1 mbar) at 150–170° C. The NCO content is 16.9%, while the free TDI content is <0.5%.

Example 2

0.25 mol of butyl triglycol (53 g) (hydroxyl value: 265) is added at room temperature to 0.625 mol (108.75 g) of toluene diisocyanate (T65) in 2 hours. In this process, the temperature is kept below 45° C. After completion of the addition, stirring is continued for a further 2.5 hours until the theoretical NCO content of 26.0% is reached. The isocyanate excess is distilled off in vacuum (0.1 mbar) at 150–170° C. The NCO content is 10.7%, while the free TDI content is <0.5%.

Example 3

0.3 mol of 1-decanol (47.4 g) is added at 50° C. to 0.6 mol (104.4 g) of toluene diisocyanate (T80) in 2 hours. In this process, the temperature is kept between 50° C. and 55° C. After completion of the addition, stirring is continued for a further 3 hours until the theoretical NCO content of 24,9% is reached. The isocyanate excess is distilled off in vacuum (0.1 mbar) at 150–170° C. The NCO content is 12.7%, while the free TDI content is <0.5%.

Example 4

0.3 mol of 1-dodecanol (55.8 g) is added at 50° C. to 0.6 mol (104.4 g) of toluene diisocyanate (T80) in 2 hours. In this process, the temperature is kept between 50° C. and 55° C. After completion of the addition, stirring is continued for a further 3 hours until the theoretical NCO content of 23.6% is reached. The isocyanate excess is distilled off in vacuum (0.1 mbar) at 150–170° C. The NCO content is 11.7%, while the free TDI content is <0.5%.

Example 5

0.2 mol of cyclohexanol (20 g) is added at 30° C. to 0.8 mol (139.2 g) of toluene diisocyanate (T65) in 2 hours. In this process, the temperature increases and is kept between 50° C. and 55° C. After completion of the addition, stirring is continued for a further 3.5 hours until the theoretical NCO content of 36.9% is reached. The isocyanate excess is distilled off in vacuum (0.1 mbar) at 150–170° C. The NCO content is 15.4%, while the free TDI content is <0.5%.

Example 6

0.25 mol of isotridecanol (50 g) is added at 40° C. to 0.75 mol (130.5 g) of toluene diisocyanate (T65) in 2 hours. In this process, the temperature is kept below 60° C. After completion of the addition, stirring is continued for a further 2 hours until the theoretical NCO content of 29.1% is reached. The isocyanate excess is distilled off in vacuum (0.1 mbar) at 150–170° C. The NCO content is 11.3%, while the free TDI content is <0.5%.

Example 7

0.25 mol of butanol (18 g) is reacted with 0.5 mol of caprolactone (57 g) and 0.1% (0.075 g) of DBTL at 160° C. for 6 hours and then cooled to 50° C. The hydroxyester (BuCP2) (hydroxyl value 186) prepared in this way is added at 40° C. to 0.75 mol of toluene diisocyanate (130.5 g) in 2 hours. In this process, the temperature is kept below 60° C. After completion of the addition, stirring is continued for a further 2 hours until the theoretical NCO content of 25.5% is reached. The isocyanate excess is distilled off in vacuum (0.1 mbar) at 150–170° C. The NCO content is 8.9%, while the free TDI content is <0.5%.

Example 8

0.2 mol of methoxypoly(ethylene glycol) 350 (70 g) is added at 50° C. to 0.6 mol (104.4 g) of toluene diisocyanate (T80) in 2 hours. In this process, the temperature is kept between 50° C. and 55° C. After completion of the addition, stirring is continued for a further 3 hours until the theoretical NCO content of 24.1% is reached. The isocyanate excess is distilled off in vacuum (0.1 mbar) at 150–170° C. The NCO content is 8.0%, while the free TDI content is <0.5%.

TABLE 1

| | Monoadducts | | | |
|---|---|---|---|---|
| Example | Alcohol | NCO content | Equ. Weight | Mol ratio |
| 1 | Butanol | 16.9% | 248 | 2.5:1 |
| 2 | Butyl tri-glycol | 10.7% | 392 | 2.5:1 |
| 3 | Decanol | 12.7% | 330 | 2:1 |
| 4 | Dodecanol | 11.7% | 358 | 2:1 |
| 5 | Cyclo-hexanol | 15,4% | 274 | 4:1 |
| 6 | Isotri-decanol | 11.3% | 372 | 3:1 |
| 7 | BuCP2 | 9.2% | 457 | 3:1 |
| 8 | MPEG 350 | 8.0% | 525 | 3:1 |

2. PREPARATION OF THE UREA URETHANES (ACCORDING TO THE INVENTION), EXAMPLES 9–16

Example 9

15.9 g of LiCl and 68 g (0.5 mol) of xylene diamine are dissolved at 80° C. in 332 g of N-methylpyrrolidone. 248 g of the monoadduct prepared in Example 1 are then added in the course of 1 hour. After completion of the addition, stirring is continued for a further 30 min and then cooling is carried out to room temperature. The urea urethane solution obtained in this way has a solids content of 50% by weight. A clear product is obtained that remains stable for a fairly long time without gel formation.

Example 10

15.9 g of LiCl and 68 g (0.5 mol) of xylene diamine are dissolved at 80° C. in 476 g of N-methylpyrrolidone. 386 g of the monoadduct prepared in Example 2 are then added in the course of 1 hour. After completion of the addition, stirring is continued for a further 30 min and then cooling is carried out to room temperature. The urea urethane solution obtained in this way has a solids content of 50% by weight. A clear product with longterm stability is obtained.

Example 11

25.8 g of $LiNO_3$ and 68 g (0.5 mol) of xylene diamine are dissolved at 80° C. in 424 g of dimethylformamide. 332 g of the monoadduct prepared in Example 3 are then added in the course of 1 hour. After completion of the addition, stirring is continued for a further 30 min and then cooling is carried out to room temperature. The urea urethane solution obtained in this way has a solids content of 50% by weight. The product is clear for a fairly long time interval.

Example 12

25.8 g of $LiNO_3$ and 68 g (0.5 mol) of xylene diarnine are dissolved at 80° C. in 839 g of dimethylacetamide. 360 g of the monoadduct prepared in Example 4 are then added in the course of 1 hour. After completion of the addition, stirring is continued for a further 30 min and then cooling is carried out to room temperature. The urea urethane solution obtained in this way has a solids content of 35% by weight. A clear product with longterm stability is obtained.

Example 13

15.9 g of LiCl and 84 g (0.5 mol) of hexamethylenediamine are dissolved at 80 °C. in 374 g of N-methylpyrrolidone . 274 g of the monoadduct prepared in Example 5 are then added in the course of 1 hour. After completion of the addition, stirring is continued for a further 30 min and then cooling is carried out to room temperature. The urea urethane solution obtained in this way has a solids content of 50% by weight. A clear product with long-term stability is obtained.

Example 14

12.9 g of $LiNO_3$ and 42 g (0.25 mol) of hexamethylenediamine are dissolved at 80° C. in 361.5 g of dimethylfonramidde. 186 g of the monoadduct prepared in Example 6 are then added in the course of 1 hour. After completion of the addition, stirring is continued for a further 30 min and then cooling is carried out to room temperature. The urea urethane solution obtained in this way has a solids content of 40% by weight. A clear product with longterm stability is obtained.

Example 15

8.0 g of LiCl and 27.2 g (0.2 mol) of xylene diamine are dissolved at 80° C. in 652 g of N-methylpyrrolidone. 191 g of the monoadduct prepared in Example 7 are then added in the course of 1 hour. After completion of the addition, stirring is continued for a further 30 min and then cooling is carried out to room temperature. The urea urethane solution obtained in this way has a solids content of 25% by weight. A clear product with longterm stability is obtained.

Example 16

9.0 g of LiCl and 27.2 g (0.2 mol) of xylene diamine are dissolved at 80° C. in 245 g of N-methylpyrrolidone. 210 g of the monoadduct prepared in Example 8 are then added in the course of 1 hour. After completion of the addition, stirring is continued for a further 30 min and then cooling is carried out to room temperature. The urea urethane solution obtained in this way has a solids content of 50% by weight. A clear product with longterm stability is obtained.

TABLE 2

Urea urethanes

| Example No. | Adduct from Example No. | Diamine | Solvent |
|---|---|---|---|
| 9 | 1 | Xylene diamine | N-methylpyrrolidone |
| 10 | 2 | Xylene diamine | N-methylpyrrolidone |
| 11 | 3 | Xylene diamine | Dimethylformamide |
| 12 | 4 | Xylene diamine | N-methylpyrrolidone |
| 13 | 5 | Hexamethylene-diamine | N-methylpyrrolidone |
| 14 | 6 | Hexamethylene-diamine | Dimethylformamide |
| 15 | 7 | Xylene diamine | N-methylpyrrolidone |
| 16 | 8 | Xylene diamine | N-methylpyrrolidone |

Application Examples

The urea urethanes according to the invention were investigated in water, solvent mixtures and in binder solutions for their ability to form gels. The achievable layer thicknesses were furthermore determined in the binders.

1:1 n-Butanol/xylol and 1:1 n-butyl acetate/methoxypropanol were used as solvent mixtures.

The following binders were used:

Desmophen VPLS 2009: hydroxyl-functional polyacrylate, 70%-solids in n-butyl acetate (Bayer AG)

Plexigum PQ 610: thermoplastic polyacrylate powder, dissolved with 60%-solids in n-butyl acetate (Röhm GmbH)

Test in the Binder:

1% of the urea urethane solution was stirred into the solvent-containing binder while stirring vigorously (Dispermat, 2m/sec).

After 24 hours, the sagging test was performed at 30–300 μm. For this purpose, this mixture was applied with a doctor blade with variable film thickness.

Evaluation: sagging property (thickness layer) in μm

Test in Solvent or Water:

To check the gel strength in water or in solvents, the urea urethanes are incorporated in the water or the solvents by simply shaking. The evaluation is made after 4 hours.

Evaluation in the water or solvent mixture: 1=strong gel, 6=no gel

TABLE 3

| | Gel strength in 1:4 n-butanol/ xylene | Gel strength in 3:1 butyl acetate/methoxy- propanol | Thickness layer in Desmophen VPLS 2009 | Thickness layer in Plexigum PQ 610 |
|---|---|---|---|---|
| Comparison Example | 3–4 | 3–4 | 120 μm/slight seeds | 90 μm/seeds |
| Example 9 | 2–3 | 2 | 150 μm/no seeds | 150 μm/no seeds |
| Example 10 | 2 | 2–3 | 180 μm/no seeds | 150 μm/no seeds |
| Example 11 | 2 | 2 | 150 μm/no seeds | 180 μm/no seeds |
| Example 12 | 2 | 2 | 150 μm/no seeds | 210 μm/no seeds |
| Example 13 | 2–3 | 2 | 150 μm/no seeds | 150 μm/no seeds |
| Example 14 | 2 | 2 | 180 μm/no seeds | 150 μm/no seeds |
| Example 15 | 2 | 2–3 | 150 μm/no seeds | 120 μm/no seeds |
| | Gel strength in water | | | |
| Example 16 | 2 | — | 150 μm/no seeds | — |

What is claimed is:

1. A process for preparing a urea urethane thixotropic agent comprising reacting a urethane-isocyanate having the formula:

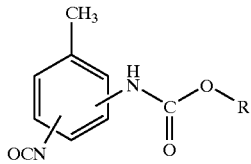

with a diamine having the formula:

$H_2N—R"—NH_2$,

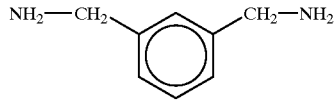

or

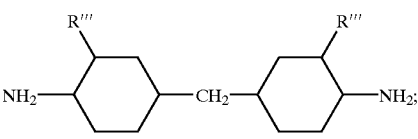

where R is n-$C_{4-22}$alkyl, iso$C_{4-22}$alkyl, $C_{6-12}$cycloalkyl, $C_{7-12}$aralkyl, $C_mH_{2m+1}(O—C_nH_{2n})_x$— or $C_mH_{2m+1}(OC(=O)—C_vH_{2v})_x$—;

R" is —$C_yH_{2y}$; and

R'" is $CH_3$— or H, wherein y is from 2 to 12; m is from 1 to 22; n is from 2 to 4; x is from 1 to 15; and v is 4 or 5, in the presence of a lithium salt;

provided that the urethane-isocyanate has had unreacted diisocyanate removed prior to reaction with the diamine.

2. The process according to claim 1, wherein the urethane-isocyanate has less than 0.5% of free toluene diisocyanate.

3. The process according to claim 1, wherein the urethane-isocyanate is prepared from a reaction of a which monohydroxyl compound having formula (I):

$$R—OH \quad (I)$$

with a 1.5 times to 5 times molar excess of toluene diisocyanate; and wherein the unreacted portion of the toluene diisocyanate is removed from the reaction mixture.

4. The process according to claim 3, wherein the molar excess of toluene diisocyanate is 2–4 mol.

5. The process according to claim 3, wherein the toluene diisocyanate isomer mixture comprises 50–80% by weight of the 2,4-isomer.

6. The process according to claim 1, wherein the urethane-isocyanate is prepared in a solvent mixture to provide a solution.

7. The process according to claim 6, wherein the solution has a solids content of 5–80% by weight.

8. The process according to claim 1, wherein 0.2–2 mol of the lithium salt, relative to the equivalent weight of the diamine, is used.

9. The process according to claim 1, wherein the lithium salt comprises $LiNO_3$.

10. A process for preparing a coating composition comprising mixing a urea urethane according to claim 1 with a paint lacquer, PVC plastisol or coating composition.

* * * * *